United States Patent
Wicks (10) Patent No.: US 7,152,018 B2
(45) Date of Patent: Dec. 19, 2006

(54) SYSTEM AND METHOD FOR MONITORING USAGE PATTERNS

(75) Inventor: Tony Wicks, Condon (GB)

(73) Assignee: Searchspace Limited, London (GB)

( * ) Notice: Subject to any disclaimer, the term of this patent is extended or adjusted under 35 U.S.C. 154(b) by 0 days.

(21) Appl. No.: 10/499,578

(22) PCT Filed: Dec. 18, 2002

(86) PCT No.: PCT/GB02/05772

§ 371 (c)(1),
(2), (4) Date: Nov. 4, 2004

(87) PCT Pub. No.: WO03/056430

PCT Pub. Date: Jul. 10, 2003

(65) Prior Publication Data

US 2005/0066011 A1 Mar. 24, 2005

(30) Foreign Application Priority Data

Dec. 21, 2004 (GB) .................................. 0130744.6

(51) Int. Cl.
*G06F 15/16* (2006.01)
(52) U.S. Cl. ...................... 702/186; 709/203; 709/217; 709/218; 709/219; 709/223; 709/224; 709/226; 709/229
(58) Field of Classification Search ................ None
See application file for complete search history.

(56) References Cited

U.S. PATENT DOCUMENTS

| | | | |
|---|---|---|---|
| 5,948,061 A * | 9/1999 | Merriman et al. ........... | 709/219 |
| 6,460,071 B1 * | 10/2002 | Hoffman ...................... | 709/203 |
| 6,757,900 B1 * | 6/2004 | Burd et al. .................. | 719/316 |
| 6,792,607 B1 * | 9/2004 | Burd et al. .................. | 719/316 |
| 6,839,680 B1 * | 1/2005 | Liu et al. ...................... | 705/10 |
| 6,915,454 B1 * | 7/2005 | Moore et al. .................. | 714/38 |
| 6,934,757 B1 * | 8/2005 | Kalantar et al. ............. | 709/229 |
| 6,944,797 B1 * | 9/2005 | Guthrie et al. ................ | 714/45 |
| 6,961,750 B1 * | 11/2005 | Burd et al. .................. | 709/203 |
| 6,970,933 B1 * | 11/2005 | Masters ...................... | 709/229 |
| 2001/0047397 A1 * | 11/2001 | Jameson ...................... | 709/217 |
| 2002/0062367 A1 * | 5/2002 | Debber et al. .............. | 709/224 |
| 2002/0136204 A1 * | 9/2002 | Chen et al. .................. | 370/352 |

(Continued)

FOREIGN PATENT DOCUMENTS

EP 1 020 804 7/2000

(Continued)

OTHER PUBLICATIONS

"What are cookies?" Internet Cookies, The U.S. Department of Energy Computer Incident Advisory Capability, No. I-034, Mar. 12, 1998, pp. 1-10.

(Continued)

*Primary Examiner*—Carol S. W. Tsai
(74) *Attorney, Agent, or Firm*—Fulbright & Jaworski LLP (57) ABSTRACT

A method of monitoring user usage patterns of a system, comprising the steps of: providing at least one state object (180), the object including a profile representative of user usage; storing the state object at a client location (110); passing, to a central server (120), the state object with each subsequent interaction initiation; and receiving, from the central server, the state object along with the response (170) of the central server, wherein the profile is modified to reflect the interaction between client location and central server. The present invention ides a system and a method for monitoring user usage patterns, and is particularly suited to use in Internet and World Wide Web applications.

23 Claims, 3 Drawing Sheets

U.S. PATENT DOCUMENTS

| | | | |
|---|---|---|---|
| 2002/0161659 A1* | 10/2002 | Veilleux et al. | 705/26 |
| 2002/0198966 A1* | 12/2002 | Jenkins | 709/219 |
| 2003/0052165 A1* | 3/2003 | Dodson | 235/381 |
| 2003/0055530 A1* | 3/2003 | Dodson | 700/231 |
| 2005/0120091 A1* | 6/2005 | Casais et al. | 709/217 |

FOREIGN PATENT DOCUMENTS

| | | |
|---|---|---|
| EP | 1 074 929 | 2/2001 |
| EP | 1 130 525 | 9/2001 |
| EP | 1 244 016 | 9/2002 |
| WO | WO 97/26729 | 7/1997 |
| WO | WO 00/75827 | 12/2000 |
| WO | WO 2000/75827 | 12/2000 |

OTHER PUBLICATIONS

European Search Report Issued for GB 0130744.6, dated Jul. 31, 2002.

Hensley, P., "Proposal for an open profiling standard", Internet article, Online Jun. 2, 1997, retrieved on May 10, 2004 (pages).

Cingil, I et al, "A broader approach to personalization", Communications of the ACM, Aug. 2000, vol. 43, No. 8 (pp. 136-141).

Cingil, I "Supporting global user profiles through trusted authorities," Sigmod Record, Mar. 2002, vol. 31, No. 1; pp. 11-17.

International Search Report Issued for PCT/GB/02/05772, dated May 26, 2004.

* cited by examiner

SYSTEM AND METHOD FOR MONITORING USAGE PATTERNS

This invention relates generally to the monitoring, recording and analysis of user activity. In particular the invention relates to a method to create and store a profile of user activity and a system for doing so.

Usage of the Internet and the World-Wide-Web ("the web") has become commonplace. The web applies a client-server computing architecture, where data is stored on server machines and can be requested and transferred to a user's computer. Users generally request pages through the use of computer applications known as "browsers", which are available for a range of computing devices, from desktop or personal, computers to mobile phones and Personal Digital Assistants (PDAs). The most common protocol used for communication between web clients and web servers is the HyperText Transfer Protocol (HTTP). Documents are commonly transferred in Hypertext Markup Language (HTML) format that allows content to be expressed for display in the client web browser. Other data transfer formats are also in common use. HTML and other formats also allow the web browser to retrieve and embed computer language scripts, commonly termed Dynamic HyperText Markup Language (DHTML), that allow additional client side programmable behaviour to be performed.

HTTP was originally a stateless transfer method, in that servers responded to each client request without relating the request to previous or subsequent requests. Internet standard RFC2029 introduced an extension to the HTTP protocol that allows the server to store a state object on the client browser, and to retrieve and change this object during subsequent transfers. This object, often referred to as a cookie, allows a stateful session (a session during which details are retained and shared between a client and server) between the client and server systems that can be used to track and identify further HTTP requests. This approach is in widespread use and allows managed client-server sessions, such as those found in web shopping systems. Cookies can be exchanged during any HTTP transfer, assuming the browser supports the capability or that the capability is not disabled. This includes the request and transfer of embedded HTML document content, such as image files. The scope of access by which servers can read and change cookie values can be controlled by Uniform Resource Locator (URL) path and Internet domain parameters. Cookies can be set and updated by server side processes or through DHTML, or similar, scripts embedded in web pages.

Numerous Internet sites use cookies to personalise web page content, to remember user or password details for future site visits, for session management in on-line sales, to track web page usage and for the targeted delivery of content and advertisements. A common practice is for a server to place a unique identifier in the cookie on a client's machine when that machine first accesses the server. This allows the browser being used by the user to be identified during subsequent requests. If a user then submits personal information such as name, address or e-mail details, then, using this process, the identifier can be used to recognize the actual user. Additional information such as the IP address or domain name of the user's computer, the browser type and version, the client operating system, the Internet service provider, the local machine time and the URL of the data being accessed can also be collected and audited during the HTTP transfer. This allows geographical and demographical information, that can be used for user identification and targeting of specific content, to be derived. The unique identifiers are also used to build aggregate historical details of URLs accessed and other such statistics. This information can then be used for marketing purposes to infer the interests of users and for the generation of targeted web page content.

In some environments the use of unique cookies for user identification purposes is undesirable, because it reduces the anonymity with which users can access resources. Unique user identification is also unnecessary in many cases where the requirement is to target content to users based on general characteristics, or profiles, of activity rather than on individual characteristics. The computational requirements to classify and extract details of users based on a single unique identifier, combined with the storage requirements to process past histories, may also be undesirable. Further, such processing cannot benefit from web page caches, or similar methods which speed access to site content, because all processing associated with the identification of the user identifier must be performed by the originating web servers.

In accordance with the present invention there is provided a method of monitoring user usage patterns of a system, comprising the steps of: providing at least one state object, the object including a profile representative of user usage; storing the state object at a client location; passing, to a central server, the state object with each subsequent interaction initiation; and receiving, from the central server, the state object along with the response of the central server, wherein the profile is modified to reflect the interaction between client location and central server.

Preferably the profile includes at least one key and value-field pair. The key is an identifier of a particular interaction type, and the value-field comprises information relating to that interaction. In a simple embodiment the value-field would contain a count of the number of occurrences of that particular interaction type. In addition to an interaction count the value-field may contain a time component denoting the time at which the count in the value-field was last modified and may also contain a second time component denoting the time that the key and value-field was first created. In other implementations additional value-field components may be used for other operational purposes.

Preferably, at least one state object is provided by the central server during the first interaction between the server and the client location. More preferably, the state object is provided as a part of the central server's response to a request for resources/information submitted by the client location.

Preferably, the modification of the profile includes; providing at least one further state object, the further state object comprising one or more key and value-field pair; and storing at least one further state object at the client location. Preferably, at least one further state object is provided by the central server. The modification of a profile may include one or more of: incrementing the count component of at least one key and value-field pair and modification of the time components of at least one value-field; adding at least one further key and value-field pair to the profile; and removing one or more key and value-field pair from the profile Preferably, modification of the profile is carried out within the central server. Alternatively, the modification of profiles is effected by one or more scripts within or included in information/resources provided to the client location by the central server, or one or more program executed at the client location, thus precluding manipulation of the profile by the server.

In a preferred embodiment of the present invention, interaction between the client location and the central server occurs via the internet, or other analogous means.

Preferably, the central server further audits the state object provided to it. Preferably, the central server performs analysis on the audited profile in order to direct services and/or information suited to the profile to the client location.

Also in accordance with the present invention there is provided a module configured to monitor user usage patterns within a system, the module resident within the system, the system comprising: a central server; and at least one client location; and the module comprising: means, within the central server, for generating at least one state object; and means for modifying a profile representative of system usage included in the state object to reflect interactions between the central server and client location, wherein the at least one state object is stored at the client location and is passed between the client location and central server during interactions.

Preferably, the profile includes at least one key and value-field pair. In one embodiment the value-field contains an interaction count. Alternatively, the value-field contains an interaction count and components relating to the time of last modification of the interaction count and/or the time of creation of the key and value-field.

In a preferred embodiment, the means for modifying includes: means for incrementing a count which embodies the value-field of at least one key and value-field pair of the profile; means for adding at least one further key and value-field pair to the profile; and means for removing one or more key and value-field pair from the profile. Preferably, modification of the profile is carried out within the central server. Alternatively, modification of the profile is effected through one or more scripts within or included in information/resources provided to the client location by the central server, or by one or more program executed at the client location, thus precluding manipulation of the profile by the server.

In a preferred embodiment of the present invention, interaction between the central server and client location occurs via the internet, or other analogous means.

Preferably, the server further includes means for auditing the profile and for analysing the audited profile of user usage, such that information/services suited thereto may be provided to the client location by the central server.

As such, the present invention provides an automated system and method for the monitoring of user activity in environments where there is the exchange and storage of state information between client and server systems, such as web and Internet environments. The invention allows profiles of user activity to be built based on a range of parameters, which may include general classifications of page content previously viewed, the URLs of pages viewed, or other details that might be used to classify or subdivide groups of web pages or web sites such as input from controls associated with one or more pages, e.g. buttons and active images (image maps). In a simple form the profile may comprise a histogram containing counts of web page types that have been accessed by a user. This information can then be used to determine the specific pattern of interests for a user and can be used to target advertisements, or other content forms, when a site is re-visited.

The site serving the web pages can also audit the profiles and these aggregations can be used to derive typical or average profiles for all users or groups of users of a system. Profile aggregations at the server may include the consideration of demographic or other information to create profile groupings. The invention is computationally efficient in that profile details are stored and updated on the client machine, rather than the server machine, and, unlike other systems, does not require database storage and lookup on the server side, since the profiles are readily available from the client machine.

The invention also has the advantage that, in one implementation where client side calculation is used to generate and update the profiles, web pages can be accessed through web page caches or similar services and direct access to the originating server is not required.

Since profile information is held on the client machine it is possible that a user may modify details of the profile or remove it completely. Obfuscation or other means can be used to deny user access to the content held. However, in web environments, where very large volumes of users access resources, it is unlikely that any errors deliberately introduced into profiles being considered would detrimentally effect system performance. Indeed, statistical, or other methods, could be used to reduce potential sources of error.

The previous discussion sets forth a particular application in which there exist problems one or more of which are addressed by the present invention. However the techniques and principles discussed hereinafter apply to other environments that apply similar mechanisms. Similar methods, for example, could be used in any client and server computing environment, in card (or other forms) of loyalty scheme, or to monitor any environment where state information is retained by a user and where this state can be updated as users access different features or areas of a system.

A specific embodiment of the present invention is now described, by way of example only, with reference to the accompanying drawings, in which.

The present invention is described in terms of an Internet web environment where cookies, or other state objects, are exchanged. Those skilled in the art will understand that the invention may be applied in a wide range of client and server computing environments or a multitude of other business environments. For example, the present invention may be implemented in any general computer or computing environment and in a multitude of business types and areas.

Description in the above terms is for convenience only. It is not intended that the invention be limited in application to this example environment, as is stated above.

Figure 1:
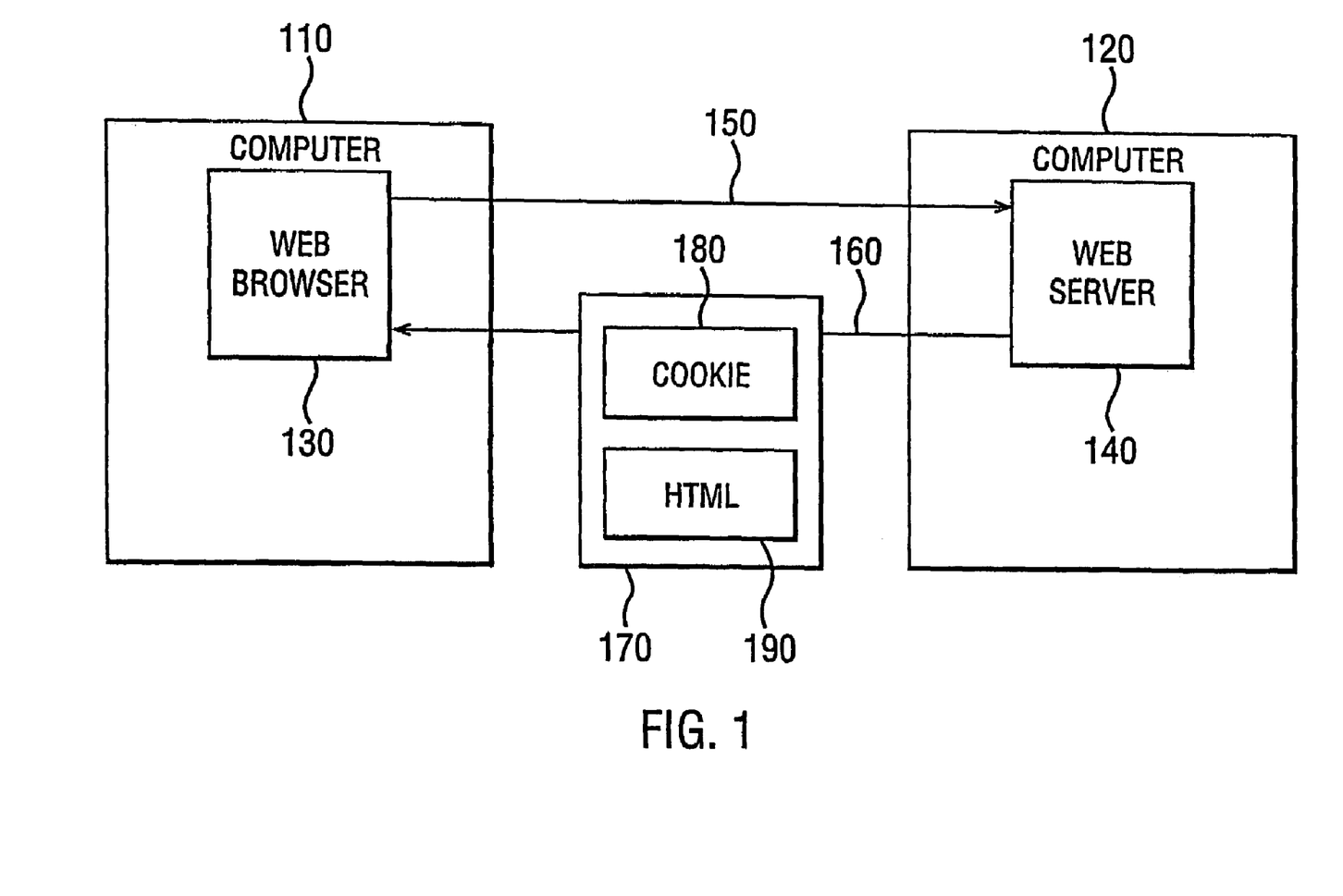
FIG. 1 is a block diagram showing one implementation of the system of the present invention and including a number of example communications within it.

In general, but not exclusive, terms the invention can be implemented as shown in FIG. 1. FIG. 1 shows a block diagram of a client computer 110 running a web browser application 130, and a server computer 120 operating with a web page server application 140. The diagram represents the sequence associated with a web page transfer between the server 120 and client 110 systems. A web page request 150 is sent to the web server 140, identifying content/resources to be transferred. This is done through the use of a URL. The web server locates the web page content/resources, or dynamically generates the content/resources, and a response 160 returns an HTTP result 170 to the requesting client. This result contains header information according to the HTTP protocol, cookie information 180 and web page content 190. This initial request assumes that there is no cookie relating to this server already set on the client browser.

Figure 2A:
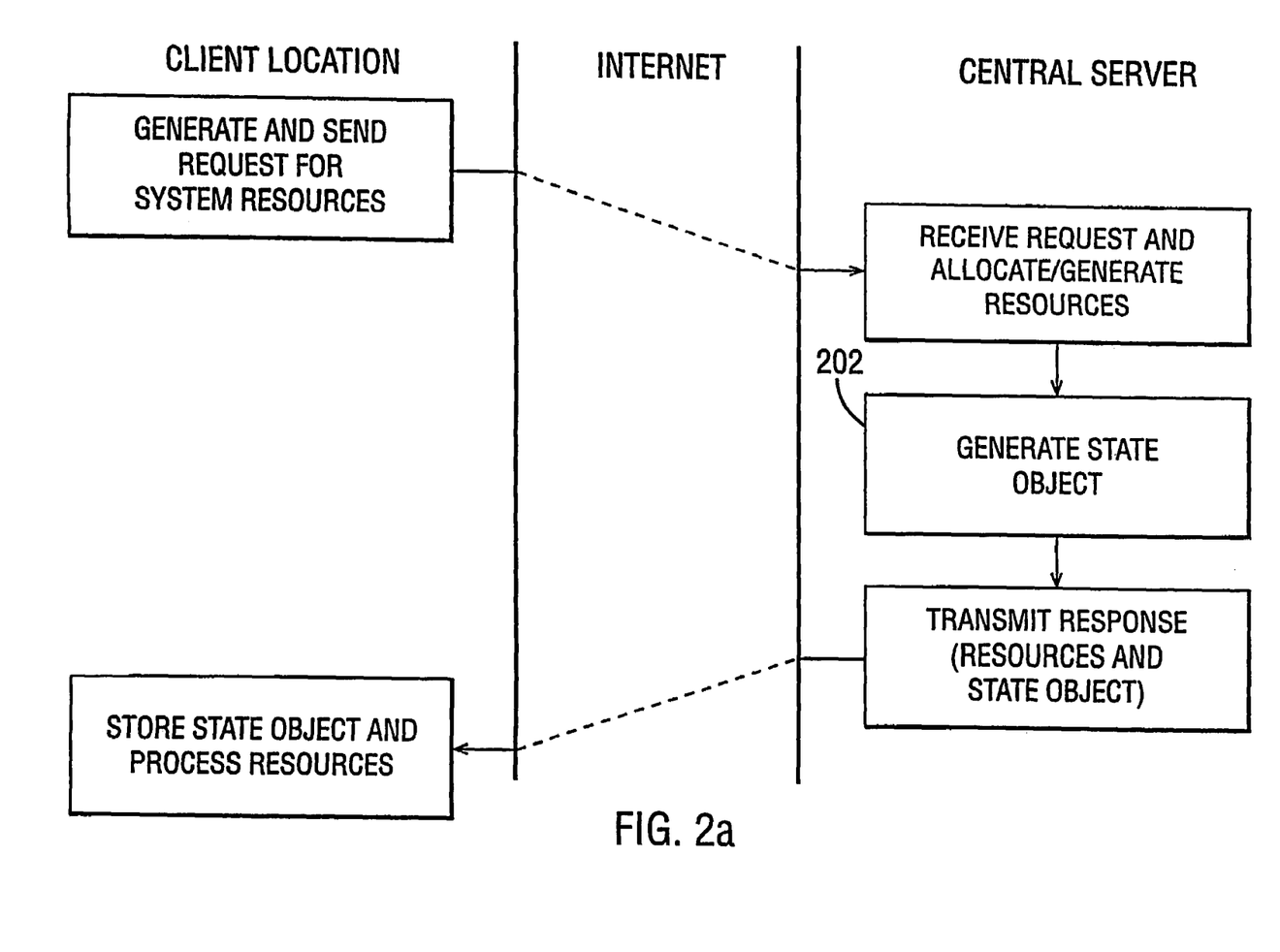
FIGS. 2a and 2b illustrate communications between server and user location during a first interaction and during a repeat interaction, respectively.
Figure 2B:
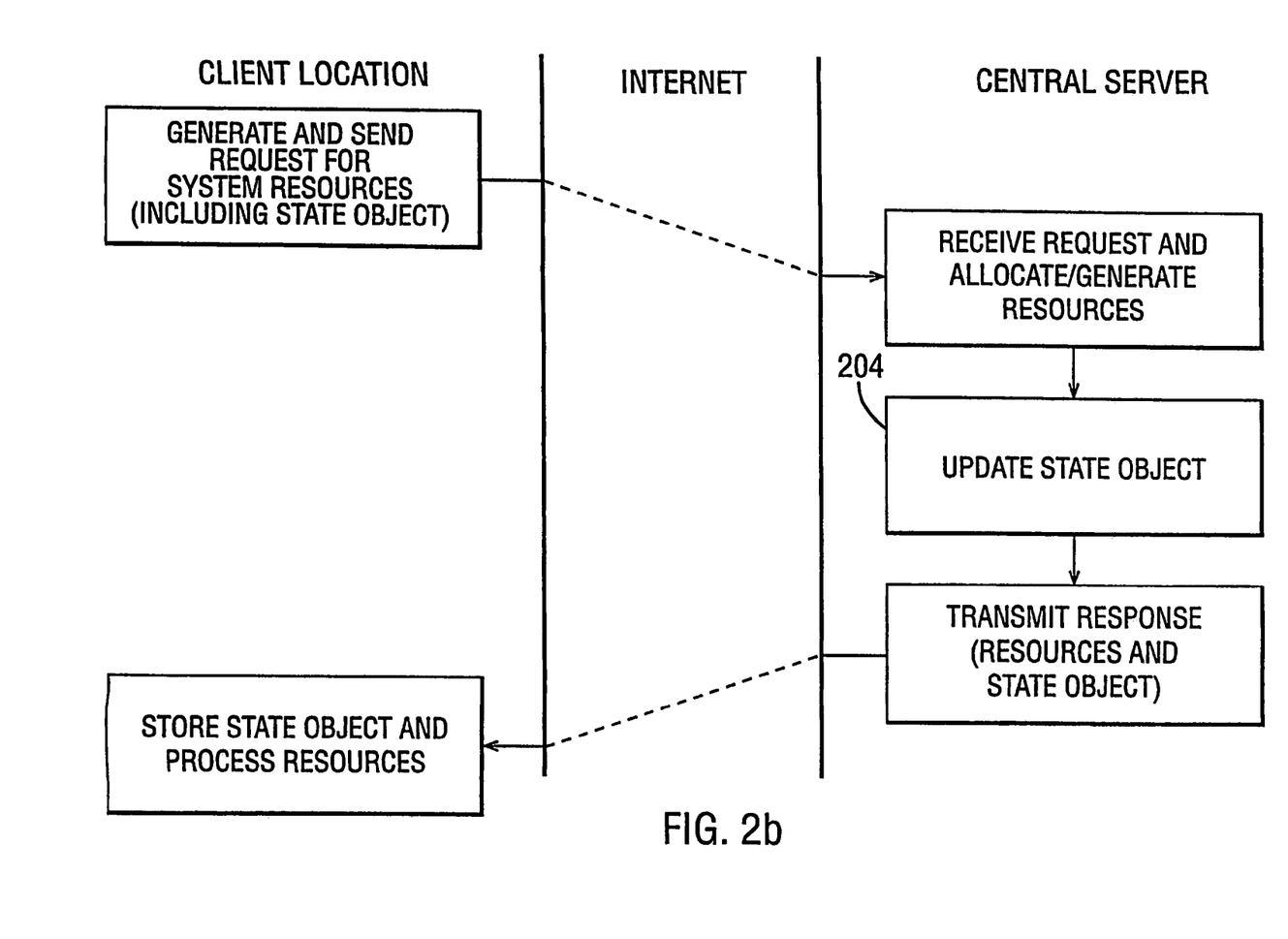

When the next request for web page content is made from client to server the cookie initially sent by the server may be sent, according to the guidelines of Internet standard RFC2029, back to the server. In this way cookies are transferred between client and server during subsequent requests, and between server and client during subsequent responses, as may be seen in FIGS. 2a and 2b. Additional cookies can be transferred and the content of existing cookies can be changed or deleted. Changes to cookies can happen as part of the server processing as indicated by the function boxes 202,204 in FIGS. 2a and 2b. Alternatively, such changes may be made as a part of the client side processing. In this situation, the changes may be initiated by and/or carried out by a part of one of more scripts downloaded with the information/resources from the server for example, as will be described further below.

In the course of operation of the invention, cookies, or groups of cookies, associated with particular areas of a web site are set and updated on the client browser. In one implementation of the invention, the value associated with a cookie comprises a set of key and value-field elements or pairs. In another implementation, multiple cookies could be used to retain the same information. In general terms the key and value-field elements or pairs represent an identifier and a count indicating the number of times that resources associated with the identifier have been accessed. For example, the key identifier may relate to the URL of pages accessed, but would more generally relate to broad classifications associated with web page content, such as sport (or areas of sport, such as football, hockey, tennis), entertainment, news, science, etc. Generally the key identifier will be an enumerated integer (although names could be used), where each integer relates directly to a content type. Typically, profiles in the invention will be represented in cookies in the following manner:

PROFILE=1002/10:234515:7783/20

The cookie contains a sequence of key/value-field pairs separated by a semi-colon. In this example there are three entries, for content classifications 1002, 2345 and 7783, with value-fields comprising interaction counts of 10, 5 and 20 respectively. Any suitable separator characters could be used between each key and value-field or between the key and value-field pairs. When an HTTP request is made to a server, the client browser sends the existing profile as a part of the request:

Cookie: PROFILE=1002/10:2345/5:7783/20;

The server can then amend value-fields as part of the HTTP response, where content types are already represented, as follows:

Setookie: PROFILE=1002/10:2345/6:7783/20;path=/; expires=Thursday, 5-Dec.-2002 12:15:00; domain=acme.com or add to the profile where a new content type is presented in the response, as follows:

SetCookie:PROFILE=1002/10:1899/1:2345/5:7783/20; path=/;expires=Thursday, 5Dec.-2002 12:15:00; domain=acme.com In these cases the "domain" and "path" attributes are used to control the operational scope of the cookies whilst the "expires" attribute is used to define the time at which the cookie becomes invalid, according to the standard defined in RFC2029. The "expires" attribute will generally be set sufficiently in the future such that the cookie never expires, or the attribute could be updated so that the cookie expires a given time period after the last access was performed.

In an alternate implementation of the invention, a time specifier may be added to the value-fields detailing the last time at which the key value-field pair was changed. In this case the cookie would take the following form:

PROFILE=1002/10/TIME1:189911/TIME2:2345/5/ TIME3:7783/20/TIME4

In another alternate implementation of the invention, a time of creation specifier may be added to each value-field. This specifier will detail the time at which the key and value-field was created. In this case the cookie would take the following form:

PROFILE=1002/10/TIME1/TIME1creation:1899/1/ TIME2/TIME2creation: 2345/5/TIME3/TIME3creation:7783/20/TIME4/ TIME4creation Of course, a time of creation specifier may be added to value fields containing only interaction counts also.

An efficient time representation is a long integer count of seconds or milliseconds, based upon some epoch.

Through the use of scripts within web pages, or included in web pages, it will be understood that it is possible to update and manipulate the contents of the cookie profile without requiring any server side manipulation. In this case, each web page may call the same function in a single script file, which passes an enumerated identity number that classifies the web page content, to update the profile cookie value. Alternatively, changes may be initiated and/or carried out by computer programs running on the client, such as ActiveX controls or web-browser plug-ins.

As a user browses multiple pages and HTTP requests are made for additional content, the profile of user behaviour held in the cookie on the client browser will change to represent the user pattern of interests. This pattern is then audited, when the cookie is sent as part of a request to a web server or may be accessed and used from within the web page or otherwise by the client computer. It is therefore possible to perform statistical analysis on the profile in order to identify content most suitable to be served to the user. In this way targeted content or targeted advertising content can be served to a user, in response to web page requests. A simple example of this targeting would be the ordering of page content or navigation details on a page in accordance with preferences or weighted importance expressed in the profile.

Since the profile of user activity is held in a cookie on the web browser of the client computing device, server-side storage requirements are minimised. According to RFC2029, each cookie can hold up to 4 kilobytes of information, which is sufficient to store at least 120 key and value field elements or pairs (dependent upon the precise make-up of the components of the value-field). If there is a requirement to extend the profile beyond these limits, the profile can be extended across multiple cookies, e.g. PROFILE1, PROFILE2. Increasing the granularity of the profile in this way will improve the ability of the system to classify user behaviour. However, where there is limited storage, older key and value pairs may be removed in order to make room for newer values. In this case, the older values, or older values with small value counts, are removed in preference to newer values.

In another form of the invention, a second cookie is set on the client browser and operates in an identical fashion to that described above. A second profile included within the second cookie may be audited and removed by server systems. Periodic removal in this way allows server systems to track usage between defined time periods associated with initial population and removal of the profile. Removal can also be limited to be performed only when particular resources are accessed. Thus, user interests associated with access to that resource can be measured for a population of users. As an example, a client browser may have the following profile information on access to a given server PROFILE=1002/10/TIME1:1899/1/TIME2:2345/5/
TIME3:7783/20/TIME4 TRANSIENT_PROFILE=1002/10/TIME1:1899/1/TIME2

Following access to the server, and auditing of the transient profile, the profiles might become:

PROFILE=1002/11/TIME1:1899/1/TIME2:2345/5/
TIME3:7783/20/TIME4 TRANSIENT PROFILE=

In effect, a nontransient profile provides an historical record of user interests over an extended period. It is the purpose of a transient profile to allow recent user interests to be identified associated with a particular resource and thus to avoid re-counting users who have previously accessed the resource (i.e. outside the period of interest). If a nontransient profile were utilised for this purpose, previous access by users would be counted and an unrealistc count would be produced.

It is thus clear that the present invention may be implemented solely through the use of server side processing, or through the combination of client and server side processing. Where server side processing is used exclusively there is no requirement for the use of client side processing, other than that involved in the transfer and storage of cookie information. Where client side processing is used for the maintenance and update of profile data there is no requirement for access to the server originating the page content, and the client can therefore be served through web caches, or proxy servers. This makes the invention highly scalable and very efficient. However, direct server access will be required in order to audit profile information, unless such auditing is carried out directly by the client application.

The present invention is particularly, but not exclusively as has already been set forth, suited to Internet environments for the monitoring of web pages and similar content forms. The profiles generated by the invention audit a user's system behaviour and can be used to infer a users pattern of interests. In this way, the invention can be used to build profiles of user behaviour for those using Internet services such as web sites, for the generation of targeted page content, such as targeted advertising, for the targeted sale of goods or services and for logging and audit purposes. The invention has the advantage of anonymity, robustness and reduced server side storage requirements.

It will of course be understood that the present invention has been described above purely by way of example, and that modifications of detail can be made within the scope of the invention.

The invention claimed is:

1. A method of monitoring user usage patterns of a system, comprising the steps of:
   providing at least one state object, the object including a profile representative of user usage;
   storing the state object at a client location;
   passing, to a central server, the state object with each subsequent interaction initiation; and
   receiving, from the central server, the state object along with the response of the central server;
   wherein the profile is modified, to reflect the interaction between the client location and the central server, by one of one or more scripts within or included in information/resources provided to the client location by the central server, and one or more programs executed at the client location, thus precluding manipulation of the profile by the server.

2. A method as claimed in claim 1, wherein the profile includes at least one key and value-field pair.

3. A method as claimed in claim 2, wherein the key is an identifier of a particular interaction type, and the value-field contains a count of the number of occurrences of that particular interaction type.

4. A method as claimed in claim 3, wherein the value-field further contains at least one of a time component detailing the last modification of the interaction count and a time component detailing the creation of the key and value-field.

5. A method as claimed in claim 1, wherein the at least one state object is provided by the central server during a first interaction between the server and the client location.

6. A method as claimed in claim 5, wherein the state object is provided as a part of the central server's response to a request for resources/information submitted by the client location.

7. A method as claimed in claim 2, wherein the step of modifying the profile includes:
   providing at least one further state object, wherein the at least one further state object includes a further profile representative of user usage, the further profile comprising one or more key and value-field pair; and
   storing the at least one further state object at the client location.

8. A method as claimed in claim 7, wherein the at least one further state object is provided by the central server.

9. A method as claimed in claim 4, wherein the modification of the profile includes one or more of:
   incrementing the count component of the at least one key and value-field pair;
   updating a time component of the at least one key and value-field pair;
   adding at least one further key and value-field pair to the profile; and
   removing one or more key and value-field pair from the profile.

10. A method as claimed in claim 1, wherein modification of the profile is carried out within the central server.

11. A method as claimed in claim 1, wherein interaction between the client location and the central server occurs via the Internet.

12. A method as claimed in claim 11, wherein the central server further audits the state object/profile passed to it.

13. A method as claimed in claim 12, wherein the central server performs analysis on the audited profile in order to direct at least one of services and information suited to the profile to the client location.

14. A module configured to monitor user usage patterns within a system, the module resident within the system, the system comprising:
   a central server; and
   at least one client location;
   the module comprising:
      means, within the central server, for generating at least one state object; and
      means for modifying a profile representative of system usage included in the state object to reflect interactions between the central server and the client location, wherein modification of the profile is effected through one of one or more scripts within or included in information/resources provided to the client location by the central server, and one or more programs executed at the client location thus precluding manipulation of the profile by the server;

wherein the at least one state object is stored at the client location and passed between the client location and central server during interaction therebetween.

15. A module as claimed in claim 14, wherein the profile includes at least one key and value-field pair.

16. A module as claimed in claim 15, wherein the value-field contains an interaction count.

17. A module as claimed in clam 15, wherein the means for modifying includes:
means for incrementing a count which embodies a value of the at least one key and value-field pair;
means for updating a time component of the at least one key and value-field pair;
means for adding at least one further key and value-field pair to the profile; and
means for removing one or more key and value-field pair from the profile.

18. A module as claimed in claim 14, wherein modifying the profile is carried out within the central server.

19. A module as claimed in claim 14, wherein interaction between the central server and the client location occurs via the Internet.

20. A module as claimed in claim 14, further including means for auditing the profile, and for analyzing the profile or user usage, such that information/services suited thereto is provided to the client location by the central server.

21. A computer program product comprising a computer readable medium having stored thereon computer program means for causing a computer to monitor user usage patterns within a system, comprising:
code for providing at least one state object, the object including a profile representative of user usage;
code for storing the state object at a client location;
code for passing, to a central server, the state object with each subsequent interaction initiation; and
code for receiving, from the central server, the state object along with the response of the central server; and
code for wherein the profile is modified, to reflect the interaction between the client location and the central server, by one of one or more scripts within or included in information/resources provided to the client location by the central server, and one or more programs executed at the client location, thus precluding manipulation of the profile by the server.

22. A method as claimed in claim 8, wherein the further state object is audited and removed after a specified time period or in response to an access by the client of a specified resource.

23. A module as claimed in claim 16, wherein the value-field contains at least one of a time component detailing the last modification of the interaction count and a time component detailing the creation of the key and value-field.

* * * * *

UNITED STATES PATENT AND TRADEMARK OFFICE
CERTIFICATE OF CORRECTION

PATENT NO. : 7,152,018 B2 Page 1 of 1
APPLICATION NO. : 10/499578
DATED : December 19, 2006
INVENTOR(S) : Tony Wicks It is certified that error appears in the above-identified patent and that said Letters Patent is hereby corrected as shown below:

On the cover page: Item (30)

On the cover page, located under Foreign Application Priority Data (left hand column), delete "Dec. 21, 2004" and replace with --Dec 21, 2001--.

In the specification:

Column 5, Line 50 delete "Setookie" and replace it with --SetCookie--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,152,018 B2 | Page 1 of 1 |
| APPLICATION NO. | : 10/499578 | |
| DATED | : December 19, 2006 | |
| INVENTOR(S) | : Wicks | |

It is certified that error appears in the above-identified patent and that said Letters Patent is hereby corrected as shown below:

On the title page, item (86), under "371 (c)(1), (2), (4) DATE:", in Column 1, Line 1, delete "Nov. 4, 2004" and insert -- Jun. 21, 2004 --, therefor.

On the title page, item (57), under "ABSTRACT", in Column 2, Line 10, delete "ides" and insert -- provides --, therefor.

In Column 3, Line 54, delete "subdivide" and insert -- sub-divide --, therefor.

In Column 5, Line 36, delete "10:234515:" and insert -- 10:2345/5: --, therefor.

In Column 6, Line 3, delete "189911" and insert -- 1899/1 --, therefor.

In Column 7, Line 11, delete "nontransient" and insert -- non-transient --, therefor.

In Column 7, Line 18, delete "unrealistc" and insert -- unrealistic --, therefor.

In Column 7, Line 38, delete "users" and insert -- user's --, therefor.

Signed and Sealed this
Third Day of July, 2012

David J. Kappos
*Director of the United States Patent and Trademark Office*